Dec. 9, 1930.  E. B. CARNS  1,784,511
LAMINATED SHEET STRUCTURE
Filed March 31, 1927
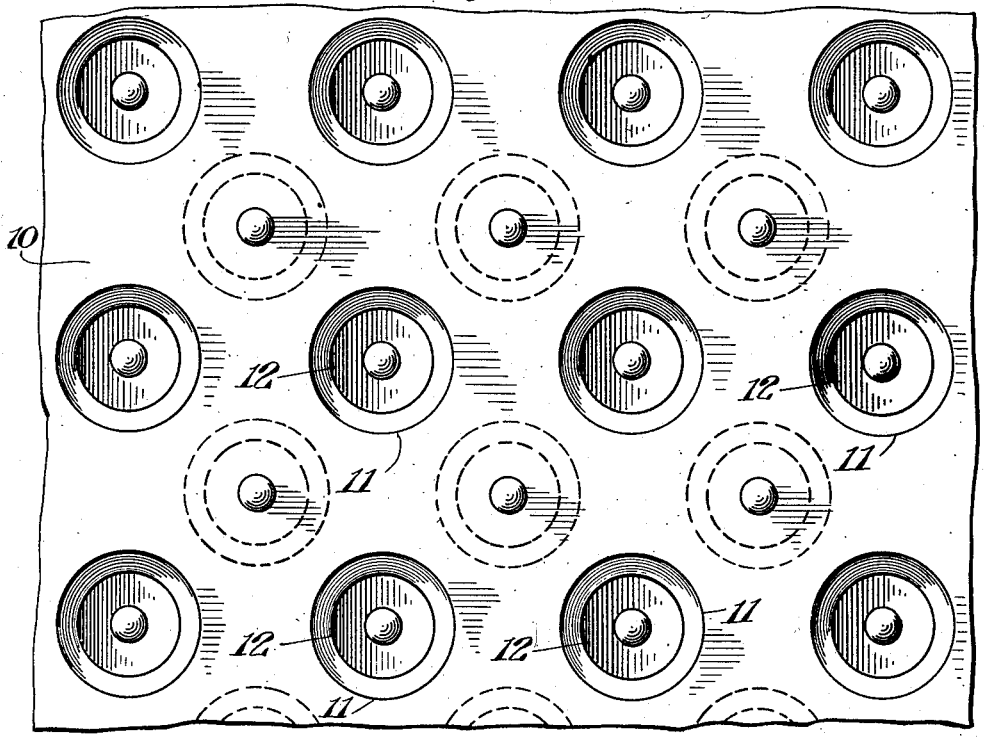
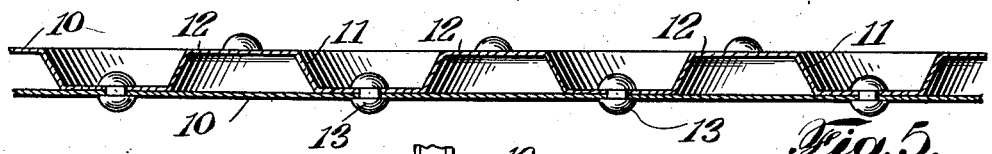
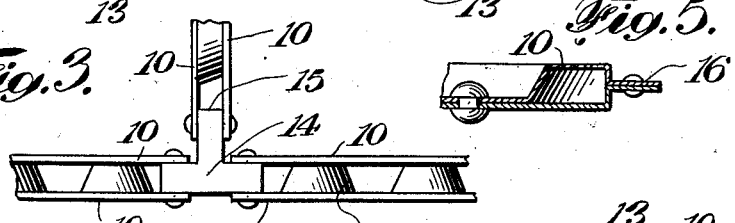
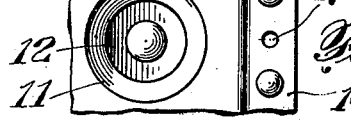

Patented Dec. 9, 1930

1,784,511

UNITED STATES PATENT OFFICE

EDMUND B. CARNS, OF NEW YORK, N. Y., ASSIGNOR TO CAIRNS DEVELOPMENT COMPANY, OF WILMINGTON, DELAWARE, A CORPORATION OF DELAWARE

LAMINATED SHEET STRUCTURE

Application filed March 31, 1927. Serial No. 179,988.

My invention relates to improvements in laminated sheets and while especially applicable to metallic sheets can include any sheet material of a laminated type.

The general object of the invention is to produce a simple laminated sheet structure having a substantial body light weight per unit of strength and unusual stiffness.

My invention is intended to produce a laminated sheet structure which has many uses in the making of aircraft, but it can be also adapted for many other purposes. I have found that by producing extrusions on the mating face of two sheets, adapting the extrusions of one sheet to fit the flat surface of the opposite sheet and then fastening the sheets together at the apex of the extrusions, I get a laminated sheet structure, in which the generally flat parts of the sheets are out of contact, but the sheet has enormous strength and great lightness. In carrying out this idea, the sheets to be united are provided with extrusions of similar height, so that when the sheets are brought together, the apex of one extrusion will meet the flat surface of the opposite sheet, and then by fastening the sheets together at the apex of the several extrusions, I get a composite sheet of enormous strength, and lightness. By those familiar with the art, it will be readily seen that the mere extruding of each sheet serves to greatly stiffen the sheet and then by fastening the two sheets thus already stiffened in the manner stated, I get a light composite sheet having the desired characteristics.

The idea can be carried out with relation to flat sheets, or the sheets can be curved and then shaped and fastened together as specified.

Reference is to be had to the accompanying drawings, in which similar reference characters represent corresponding parts in all views.

Fig. 1 is a broken plan view of a laminated sheet showing my invention.

Fig. 2 is a cross-section thereof.

Fig. 3 is a broken detail showing the application of the invention to supporting means or the like.

Fig. 4 is a cross-section of a laminated curved sheet.

Fig. 5 is a broken sectional view showing one arrangement or structure of the edge of the machine and Fig. 6 is a broken plan view of the structure shown in Figure 5.

In forming the laminated structure referred to, each sheet 10 is provided with a plurality of extruded members 11, each representing the frustum of a cone with the flat surface 12 adapted for attachment to a second sheet. So far as the invention is concerned these extrusions may be of any cross-sectional type, but the form given is easy to make and serves the purpose perfectly. When these sheets are placed together with extrusions on one sheet extending toward the opposed sheet, it will be seen that the flat surface 12 will bear against the main flat surface of the opposed sheet and then by riveting the surface 12 to the adjacent flat sheet, the two sheets are bound together firmly and are spaced apart by the thickness of the extruded parts 11. These can be as numerous, as desired, and it will be seen that each sheet 10 is greatly stiffened by the formation of these extruded elements 11, and that when the two sheets are fastened together in the manner stated the body parts of the sheets are placed so as to give desirable bulk or thickness to the laminated or composite sheet, while the structure is very light and, as stated, very strong. I have shown the parts riveted together but obviously they might be spot-welded or otherwise fastened without affecting the invention.

If a curve is to be formed, as shown in Fig. 4, the sheets 10 are curved before the extruded parts 11 are formed thereon and then the two sheets may be fastened together as stated.

In Fig. 3, I have shown one application of this structure to illustrate its adaptability for various purposes. As here illustrated, the T beam 14 is arranged so that its flange member supports adjacent laminated sheets, and it will be seen that the opposed body parts 10 of the sheet fit nicely over the flange of the T beam, to which they may be riveted or otherwise fastened. In the illustration, I have shown a vertical member having the spaced plates 10 fastened to the web 15 of the T so that, as shown, right-angled members are conventionally carried by the T. This is only one application of the structure but from it, it will be readily understood that the laminated sheet which I have shown and described has a great number of uses.

For certain purposes, the edge portions of the two sheets may be crimped or pressed together so as to lie flat-wise one upon the other as shown at 16 on Figure 5 and these meeting parts may be riveted or otherwise fastened together or they may be provided with holes 17 so that the same rivets which fasten the two sheets together at the edges may also serve to fasten them to a support, as, for example, 14 or the like. Or a hole may be left in the edges of the sheets when they are not brought together so that when applied to a structure, one fastening means can be used to secure the sheet edges and to attach them to a support or the like.

I claim:

A laminated sheet structure comprising opposed sheets each having embossments with flat extremities said embossments of substantial truncated conical form, the embossments of each sheet bearing against the plane surface of the other sheet and fastened thereto, and said embossments of the opposed sheets lying in staggered relationship.

In testimony whereof, I have signed my name to this specification this 28th day of March, 1927.

EDMUND B. CARNS.